United States Patent [19]

Saito

[11] Patent Number: 5,770,803
[45] Date of Patent: Jun. 23, 1998

[54] SEMICONDUCTOR STRESS SENSOR

[75] Inventor: Yoshimitsu Saito, Saitama-ken, Japan

[73] Assignee: Honda Giken Kogyo Kabushiki Kaisha, Tokyo, Japan

[21] Appl. No.: 707,461

[22] Filed: Sep. 4, 1996

[30] Foreign Application Priority Data

Sep. 4, 1995 [JP] Japan .................................. 7-250210

[51] Int. Cl.$^6$ ...................................................... G01L 1/00
[52] U.S. Cl. ................................ 73/777; 73/726; 73/720; 73/514.34; 73/DIG. 4; 257/415; 257/254; 257/27
[58] Field of Search ........................ 73/726, 720, 514.34, 73/DIG. 4, 763, 765, 766, 774, 777; 257/417, 27; 374/143, 46, 49, 51, 52; 310/311, 338

[56] References Cited

U.S. PATENT DOCUMENTS

| | | | |
|---|---|---|---|
| 3,582,690 | 6/1971 | Yerman | 327/516 |
| 4,191,057 | 3/1980 | Busta | 73/777 |
| 4,633,099 | 12/1986 | Tanabe et al. | 307/308 |
| 4,777,517 | 10/1988 | Onodera et al. | 357/22 |
| 4,873,871 | 10/1989 | Bai et al. | 73/777 |
| 4,964,306 | 10/1990 | Jacobsen et al. | 73/763 |
| 5,115,292 | 5/1992 | Takebe et al. | 257/415 |
| 5,187,986 | 2/1993 | Takebe et al. | 73/766 |
| 5,225,705 | 7/1993 | Hiyama et al. | 257/415 |
| 5,279,162 | 1/1994 | Takebe et al. | 73/726 |
| 5,281,836 | 1/1994 | Mosser et al. | 257/254 |
| 5,397,911 | 3/1995 | Hiyama et al. | 257/415 |
| 5,488,237 | 1/1996 | Kuwata | 257/194 |
| 5,610,340 | 3/1997 | Carr et al. | 73/718 |

FOREIGN PATENT DOCUMENTS 88219862  9/1988  Japan .

OTHER PUBLICATIONS

"Microelectronic Circuits–Second Edition" by A.S. Sedra, K.C. Smith, Copyright 1987, Chapter 6, pp. 261–263.

*Primary Examiner*—Hezron E. Williams
*Assistant Examiner*—Richard A. Moller
*Attorney, Agent, or Firm*—Lyon & Lyon LLP

[57] ABSTRACT

A semiconductor substrate has a surface layer disposed underneath a gate electrode of a field-effect transistor and having a resistance higher than the resistance of an inner layer which is formed in the semiconductor substrate below the surface layer. The surface layer is formed when a donor doped in the surface layer and an acceptor generated based on a compressive stress which is developed in the surface layer when the gate electrode is formed substantially cancel out each other. The field-effect transistor operates alternatively as a junction field-effect transistor when the surface layer is turned into a p-type structure when a compressive stress is generated in the surface layer and a metal semiconductor field-effect transistor when the surface layer is turned into an n-type structure when a tensile stress is generated in the surface layer.

11 Claims, 9 Drawing Sheets

SEMICONDUCTOR STRESS SENSOR

BACKGROUND OF THE INVENTION

1. Field of the Invention

The present invention relates to a semiconductor stress sensor for use as a pressure sensor, an acceleration sensor, or the like.

2. Description of the Prior Art

One known stress semiconductor sensor is disclosed in Japanese patent publication No. 7-7013. The stress semiconductor sensor comprises a field-effect transistor formed in a semiconductor substrate. A stress generated in the semiconductor substrate is detected based on a change in a property of the field-effect transistor. Specifically, when an external force is applied to the field-effect transistor, a stress is developed in the interface between a gate electrode and a channel layer thereof, producing a polarization which changes the threshold voltage of the field-effect transistor. Therefore, an acceleration, a pressure, or the like which has produced the external force applied to the field-effect transistor can be detected based on the change in the threshold voltage of the field-effect transistor.

According to recent studies, a change in an electric property which takes place in a semiconductor in response to a stress generated therein is considered to be caused by not only a polarization developed in the semiconductor as in a ceramic material, but also a phenomenon equivalent to a change caused in the density of an impurity in the semiconductor by the stress. The inventor of the present application has confirmed, at least, that a compressive stress produced in a semiconductor brings about a phenomenon equivalent to an increase in the density of an acceptor in the semiconductor.

Semiconductor device structure optimization based on a new view relating to the stress-dependency of electric properties is yet to be studied and developed. It has heretofore been customary to use general-purpose field-effect transistors for amplifying signals as field-effect transistors for detecting stresses.

SUMMARY OF THE INVENTION

It is therefore an object of the present invention to provide a semiconductor stress sensor which comprises a field-effect transistor having a structure optimum for detecting a stress generated therein.

According to the present invention, there is provided a semiconductor stress sensor comprising a semiconductor substrate and a field-effect transistor disposed in the semiconductor substrate for detecting a stress in the field-effect transistor based on a change in an output signal of the field-effect transistor, the field-effect transistor having a gate electrode mounted on a surface of the semiconductor substrate, the semiconductor substrate having an inner layer and a surface layer disposed adjacent to the inner layer and having a resistance higher than a resistance of the inner layer, the surface layer being positioned underneath the gate electrode.

The surface layer is formed when a donor doped in the surface layer and an acceptor generated based on a compressive stress which is developed in the surface layer when the gate electrode is formed substantially cancel out each other.

The field-effect transistor operates alternatively as a junction field-effect transistor when the surface layer is turned into a p-type structure when a compressive stress is generated in the surface layer and a metal semiconductor field-effect transistor when the surface layer is turned into an n-type structure when a tensile stress is generated in the surface layer.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

Figure 1:
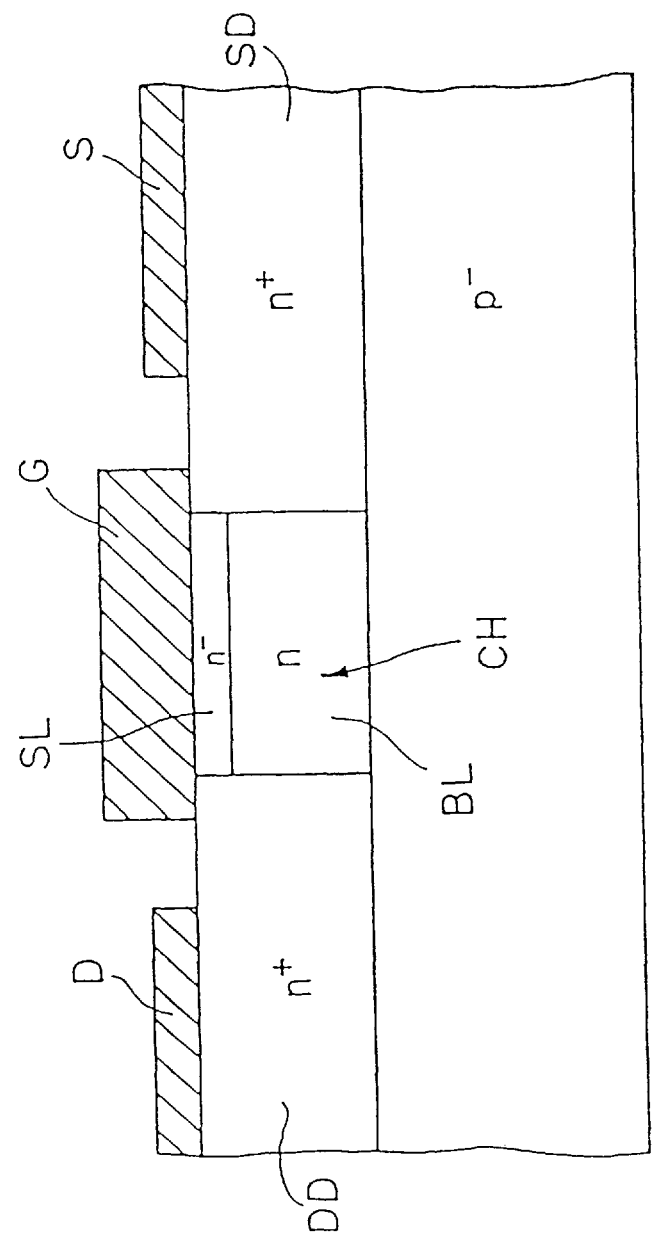
FIG. 1 is a fragmentary cross-sectional view of a semiconductor stress sensor according to the present invention.

As shown in FIG. 1, a semiconductor stress sensor according to the present invention comprises a field-effect transistor. The field-effect transistor has a semiconductor substrate including an n-type (n+) low-resistance source diffusion layer SD and an n-type (n+) low-resistance drain diffusion layer DD which are deposited on a p-type (p−) high-resistance layer. The field-effect transistor includes an n-type (n) channel layer CH having a relatively low resistance which is disposed between the source diffusion layer SD and the drain diffusion layer DD. The source diffusion layer SD and the drain diffusion layer DD are connected respectively to a source electrode S and a drain electrode D that are mounted on respective upper surfaces of the source diffusion layer SD and the drain diffusion layer DD. A gate electrode G is mounted on an upper surface of the channel layer CH. The channel layer CH comprises an inner channel layer BL of a relatively low resistance disposed on the p-type (p−) high-resistance layer and a surface channel layer SL of a high resistance disposed on the inner channel layer BL and held in contact with the gate electrode G.

The surface channel layer SL is formed when a donor doped in the surface region of the semiconductor substrate and an acceptor produced based on a compressive stress which is generated in the surface of the channel layer when the gate electrode G is formed substantially cancel out each other. The compressive stress which is generated in the surface of the channel layer when the gate electrode G is formed is a thermal stress produced based on a thermal strain due to the difference between the coefficients of thermal expansion and rigidities of the metal material of the gate electrode G and the material of the semiconductor substrate. The magnitude of the thermal stress can be controlled at a desired value by changing the metal material of the gate electrode G and the temperature for heat-treating the assembly.

The semiconductor substrate with the field-effect transistor shown in FIG. 1 being formed therein is supported in a cantilevered fashion. An acceleration applied to the field-effect transistor is detected based on a change in a source-drain current of the field-effect transistor. Specifically, when a maximum acceleration to be detected is applied to the field-effect transistor, a maximum compressive stress and a tensile stress are developed in the field-effect transistor. First, a maximum amount Namax of the acceptor produced in the surface channel layer SL based on the maximum compressive stress is assumed to be of about $10^{15}$ cm$^{-3}$ at 100 G according to the experience of the inventor. Then, the density Nd of the donor to be doped in the surface channel layer SL underneath the gate electrode G is assumed to be of about $10^{15}$ cm$^{-3}$, which is the same as the maximum density Namax of the acceptor. The density of the acceptor produced due to the compressive stress generated when the gate electrode G is formed, for canceling out the donor density to form the high-density surface channel layer SL, is also assumed to be of about $10^{15}$ cm$^{-3}$.

When no acceleration is applied to the surface channel layer SL, since the donor doped at the density of about $10^{15}$ cm$^{-3}$ and the acceptor generated at the same density of about $10^{15}$ cm$^{-3}$ due to the thermal stress when the gate electrode G is formed cancel out each other, the surface channel layer SL serves nearly as an intrinsic semiconductor and has a high resistance. When a maximum acceleration is imposed on the surface channel layer SL, developing a maximum compressive stress therein, the density of the acceptor increases by about $10^{15}$ cm$^{-3}$, and is deduced by the donor density, resulting in a net acceptor left at the density of about $10^{15}$ cm$^{-3}$. In this condition, the surface channel layer SL underneath the gate electrode G and the inner channel layer BL jointly make up a pn junction, making the field-effect transistor function as a junction field-effect transistor (JFET).

When a reversed maximum acceleration is imposed on the surface channel layer SL, developing a maximum compressive stress therein, the compressive stress generated based on the thermal stress when the gate electrode G is formed is substantially offset by a maximum tensile stress generated based on the reversed maximum acceleration, so that the acceptor generated at the density of about $10^{15}$ cm$^{-3}$ based on the thermal stress is substantially eliminated. As a result, the donor doped at the density of about $10^{15}$ cm$^{-3}$ is left in the surface channel layer SL. In this condition, the surface channel layer SL becomes an n-type layer, making the field-effect transistor function as a metal semiconductor field-effect transistor (MESFET).

As described above, the semiconductor stress sensor according to the present invention switches between a JFET and a MESFET depending on the polarity or direction of the acceleration which acts thereon. The principles of operation of the JFET and the MESFET are not essentially different from each other because the source-drain current in the JFET is controlled by the width of the depletion layer of the pn junction and the source-drain current in the MESFET is controlled by the width of the depletion layer of a Schottky barrier. Specifically, if the inner channel layer BL has a depth D and the depletion layer formed in the inner channel layer BL has a thickness d, then the source-drain current Ids varies depending on the thickness d of the depletion layer according to the following equation:

$$Isd=Isdo(D-d)/D \tag{1}$$

The thickness d of the depletion layer of the pn junction is expressed by:

$$d=[2\epsilon s\epsilon oNa(Vbi-Vg)/(qNd(Na-Nd))]^{1/2} \tag{2}$$

and the thickness d of the depletion layer of the Schottky barrier is expressed by:

$$d=[2\epsilon s\epsilon o(Vbi-Vg)/(qNd)]^{1/2} \tag{3}$$

where $\epsilon s\epsilon o$ represents the dielectric constant of the semiconductor substrate, Vbi the built-in potential of the barrier, Vg the gate voltage, q the electric charge of an electron, and Nd the acceptor density.

As can be seen from the above equations (1) through (3), in order to cause a large change in the source-drain current based on the acceleration, the width d of the depletion layer needs to change greatly, and, to that end, the absolute value of the difference Na–Nd between the acceptor and donor densities needs to change greatly over several figures based on the generated stress. Inasmuch as the absolute value of the difference Na–Nd changes greatly over several figures due to the applied acceleration and hence the thickness d of the depletion layer changes greatly in the semiconductor stress sensor according to the present invention, the semiconductor stress sensor according to the present invention is highly sensitive to stresses.

Figure 2:
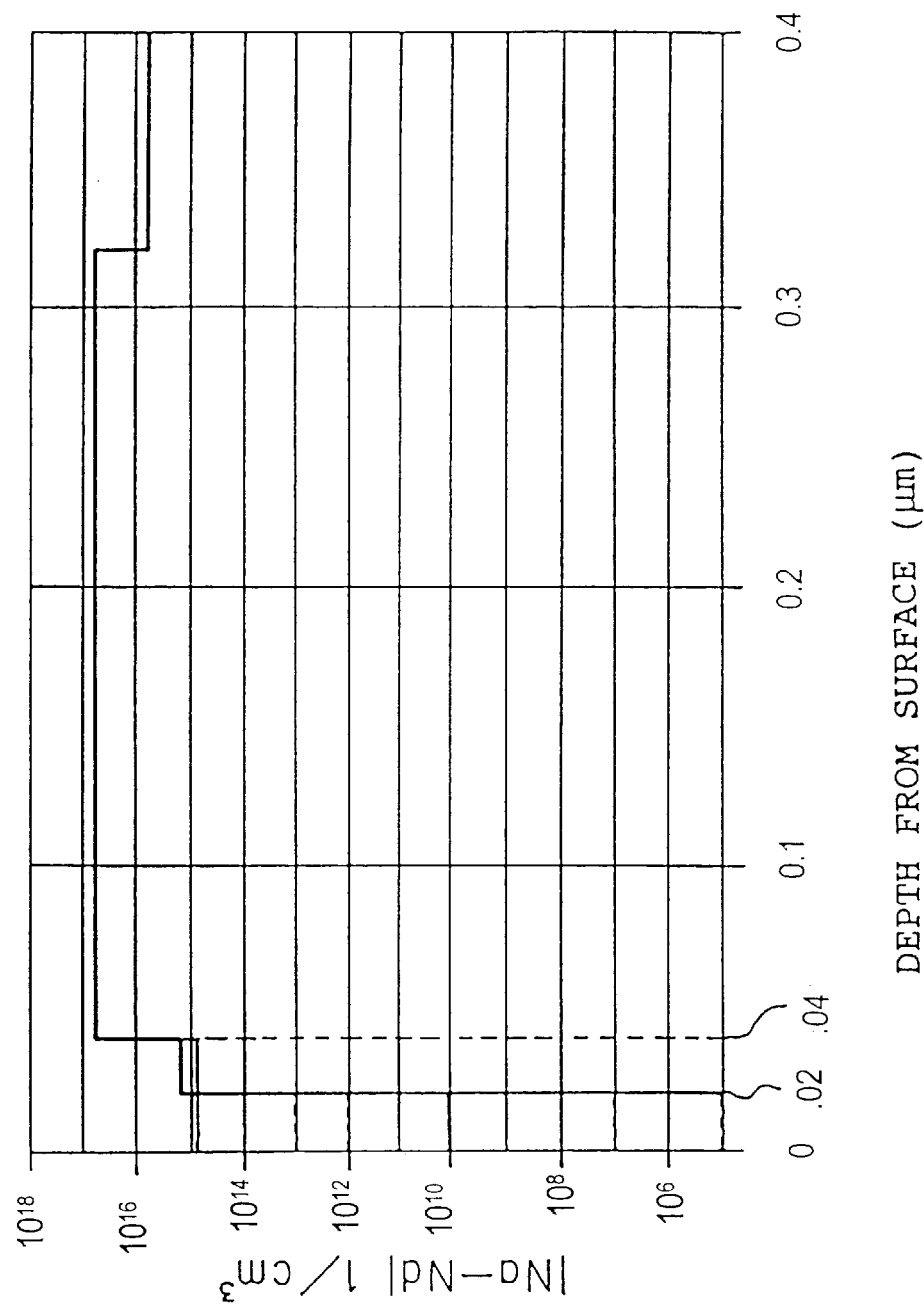
FIG. 2 is a diagram showing the relationship between the density of an impurity in a channel of the semiconductor stress sensor and the depth from a surface of the channel.

FIG. 2 shows an impurity density distribution in the semiconductor substrate which has been used in a simulation of the semiconductor stress sensor according to the present invention. The abscissa of the graph shown in FIG. 2 represents the depth ($\mu$m) from the surface of the semiconductor substrate or the surface channel layer SL underneath the gate electrode G and the ordinate represents the absolute value (cm$^{-3}$) of the difference Na–Nd. As shown in FIG. 2, the surface channel layer SL is divided into a region extending from the depth of 0.02 $\mu$m to the depth of 0.04 $\mu$m and having a donor density of about $10^{15}$ cm$^{-3}$, and a region extending from the surface to the depth, of 0.02 $\mu$m and having a lower donor density. The inner channel layer BL comprises an n-type layer of a relatively low resistance extending from the surface channel layer SL down to the depth of 0.3 $\mu$m and having a donor density of about $8\times10^{16}$ cm$^{-3}$.

Figure 3:
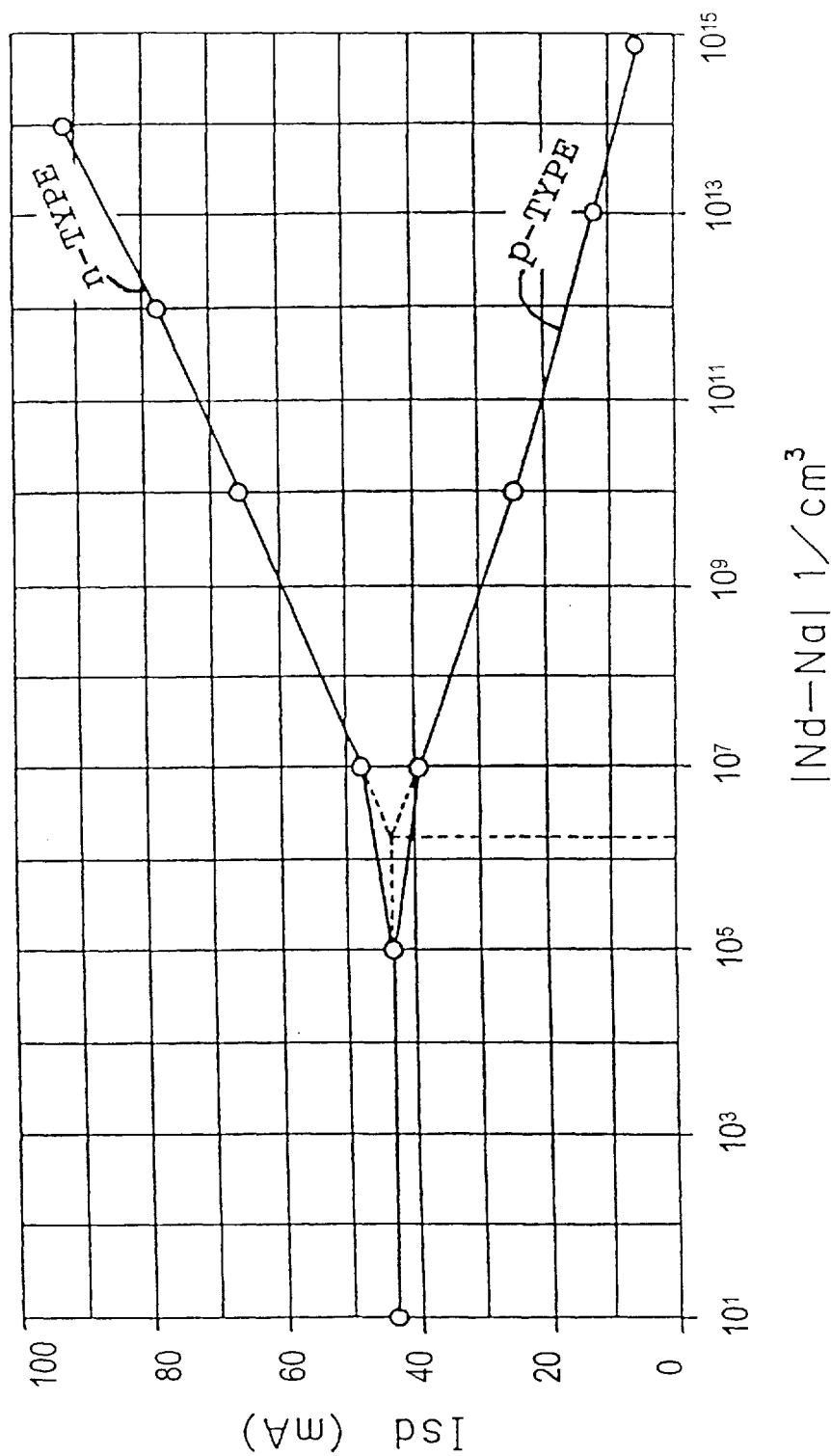
FIG. 3 is a diagram showing how a source-drain current changes when the density of the impurity changes based on a stress applied to the semiconductor stress sensor.

With the structure shown in FIG. 1 and the impurity density distribution shown in FIG. 2, as the acceptor increases and decreases based on compressive and tensile stresses generated in the surface region extending from the surface to the depth of 0.02 $\mu$m, the absolute value of the difference Na–Nd in the surface region changes. FIG. 3 shows how the source-drain current changes as calculated according to the equations (1) through (3) when the absolute value of the difference Na–Nd in the surface region changes.

When the acceptor density Na in the surface channel layer SL increases as the compressive stress increases, the width of the depletion layer in the n-type inner channel layer BL increases and the thickness of the inner channel layer BL decreases, resulting in a reduction in the source-drain current Ids. When the acceptor density Na in the surface channel layer SL decreases as the compressive stress decreases, the width of the depletion layer in the n-type inner channel layer BL decreases and the thickness of the inner channel layer BL increases, resulting in an increase in the source-drain current Isd. Even when attempts are made to further reduce the acceptor density Na in the surface channel layer SL, it cannot be reduced below a certain intrinsic carrier density ($1.79\times10^6$ cm$^{-3}$ for GaAs at room temperature), and the source-drain current becomes constant.

When the acceptor density Na decreases and the donor density Nd increases in the surface channel layer SL as the tensile stress increases, the width of the depletion layer in the n-type inner channel layer BL further decreases and the thickness of the inner channel layer BL further increases, resulting in a further increase in the source-drain current Isd. As a result, in the semiconductor stress sensor according to the present invention, the source-drain current Isd changes by several tens mA, one figure larger than the source-drain current in a conventional semiconductor stress sensor, upon application of an acceleration.

Figure 4:
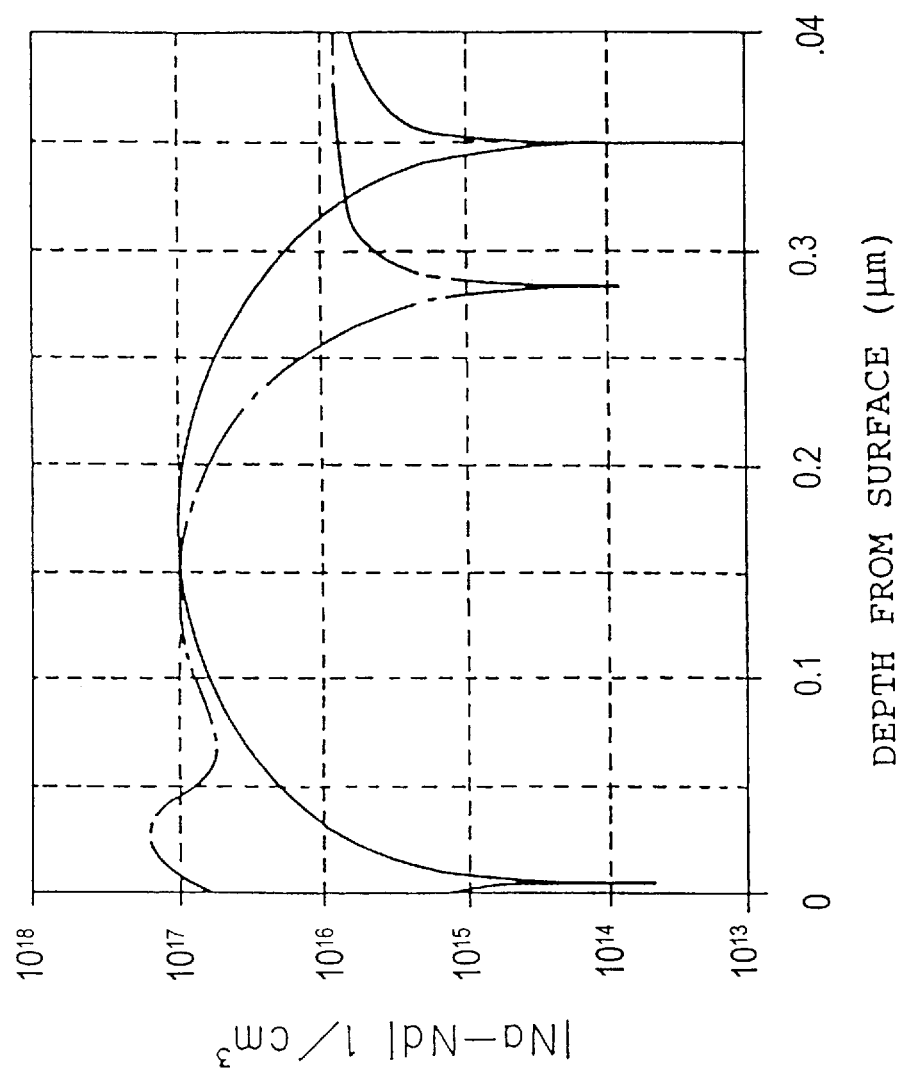
FIG. 4 is a diagram showing an impurity density distribution of the semiconductor stress sensor according to the present invention and an impurity density distribution of a conventional semiconductor stress sensor.

FIG. 4 shows, for comparison, an impurity density distribution in a inventive semiconductor stress sensor produced based on the results of the simulation and a typical impurity density distribution in a conventional semiconductor stress sensor. The solid-line curve represents the impurity density distribution in the inventive semiconductor stress sensor, and indicates that, in the surface region, the donor is canceled out by the acceptor produced by the compressive stress when the gate electrode is formed, and that the region immediately below the surface is turned into a high-resistance p-type layer. The dot-and-dash-line curve represents the typical impurity density distribution in the conventional semiconductor stress sensor, and indicates that a high-density n-type layer is formed immediately below the surface in order to reduce an ohmic resistance in contact with the gate electrode and avoid adverse effects of the surface level.

Figure 5:
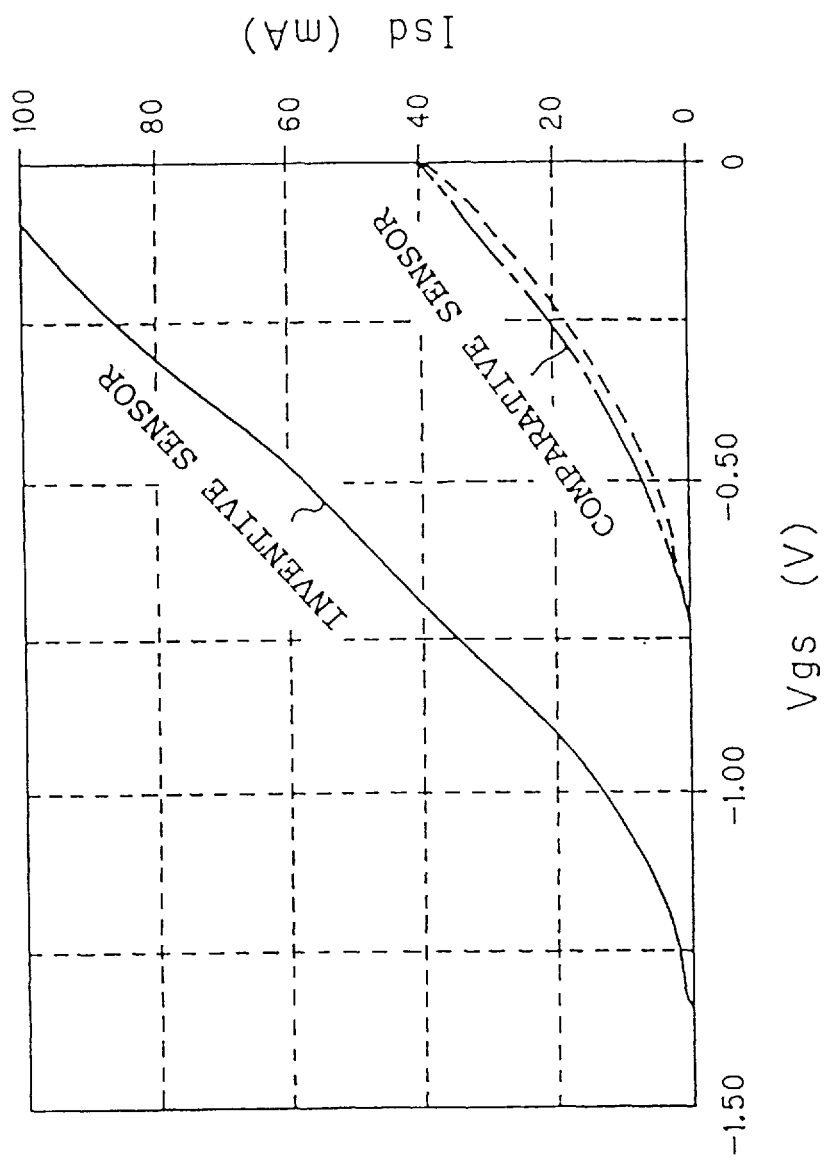
FIG. 5 is a diagram showing the relationship between a source-drain current and a gate-source voltage of the semiconductor stress sensor according to the present invention and the conventional semiconductor stress sensor.

FIG. 5 shows the relationship between the source-drain current Isd and the gate-source voltage Vgs with respect to each of the impurity density distribution, indicated by the solid-line curve in FIG. 4, in the inventive semiconductor stress sensor and the typical impurity density distribution, indicated by the dot-and-dash-line curve in FIG. 4, in the conventional semiconductor stress sensor. The dotted-line curve represents the relationship between the source-drain current Isd and the gate-source voltage Vgs before a tensile stress is produced. The solid-line curve and the dot-and-dash-line curve represent the relationship between the source-drain current Ids and the gate-source voltage Vgs after a tensile stress is produced by bending the inventive and conventional semiconductor stress sensors, respectively. A study of FIG. 5 clearly shows that whereas the source-drain current Isd of the conventional semiconductor stress sensor changes only by several mA, the source-drain current Ids of the inventive semiconductor stress sensor changes only by several tens mA. It has experimentally been evidenced that the sensitivity of the inventive semiconductor stress sensor is about one figure higher than the conventional semiconductor stress sensor.

A process of fabricating the semiconductor stress sensor according to the present invention will be described below with reference to FIGS. 6A through 6I.

Figure 6A:
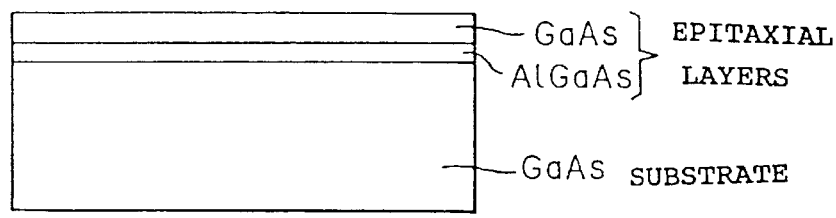
FIGS. 6A through 6I are fragmentary cross-sectional views showing a process of fabricating the semiconductor stress sensor according to the present invention.

As shown in FIG. 6A, an AlGaAs layer serving as an etch stop layer is deposited to a thickness of about 3 $\mu$m by epitaxial growth on a (100) GaAs substrate, and then a p-type GaAs layer having an impurity density of $6.5\times10^{15}$ $cm^{-3}$ is deposited to a thickness of about 10 $\mu$m by epitaxial growth on the AlGaAs layer. Thereafter, an alignment mark for a mask pattern is formed.

Specifically, the surface of the assembly is coated with a photoresist, and then pre-baked, exposed, developed, and post-baked to form a pattern of a photoresist film. Thereafter, the GaAs layer is etched by an etching solution of $H_2SO_4$ to produce an alignment mark, after which the photoresist film is removed. The above various steps to form a mask pattern are referred to as a process of forming a photoresist pattern. The produced photoresist pattern will be removed by being dissolved with acetone and washed.

Figure 6B:
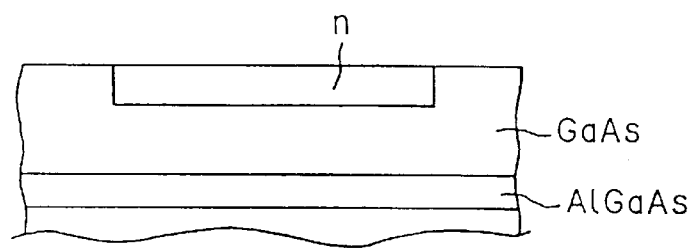
Figure 6C:
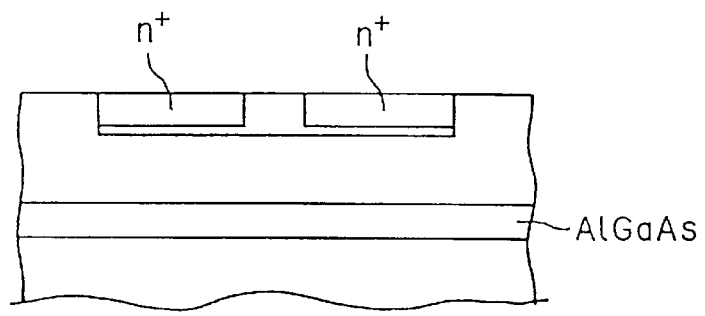

Then, as shown in FIG. 6B, an n-type impurity of S is introduced into the GaAs layer by ion implantation at 200 kV and a density of $2\times10^{12}$ $cm^{-2}$, forming an active layer. Thereafter, the photoresist pattern is removed. In order to introduce a high-density n-type impurity (n+) for suppressing the adverse effects of the surface level, a photoresist pattern is formed. Then, as shown in FIG. 6C, an impurity of Si is introduced into the active layer by ion implantation at 160 kV and a density of $5\times10^{12}$ $cm^{-2}$, after which the photoresist pattern is removed. The density of the introduced impurity of Si is selected to suppress the adverse effects of the surface level and prevent a gate leakage from affecting device characteristics.

Figure 6D:
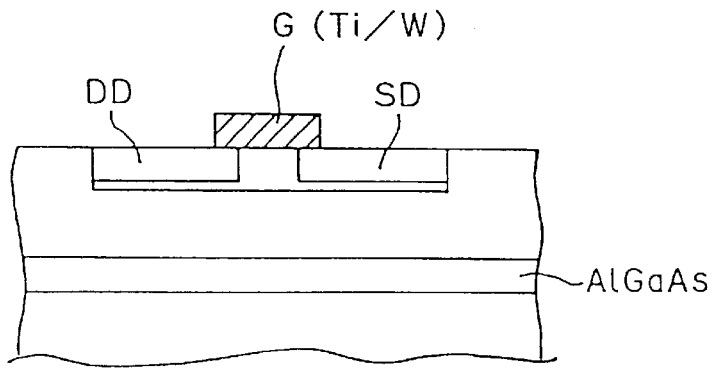

Then, the introduced impurity is activated under ramp annealing conditions in order to prevent the impurity from being excessively diffused. Specifically, the assembly is heated at an increasing temperature at an increasing rate of 200° C./sec. and then held at 900° C. for 5 seconds. Thereafter, as shown in FIG. 6D, a layer of Ti and a layer of W are deposited to respective thicknesses of 300 Å and 4000 Å by sputtering, and then a photoresist pattern is formed. The layers of Ti and W are then etched by reactive ion etching (RIE) using a gas of $CF_4$ and $O_2$, thereby forming a gate electrode G. Thereafter, the photoresist pattern is removed. The material Ti is used for the purpose of improving the adhesion of the material W of a high Young's modulus to the GaAs layer.

Figure 6E:
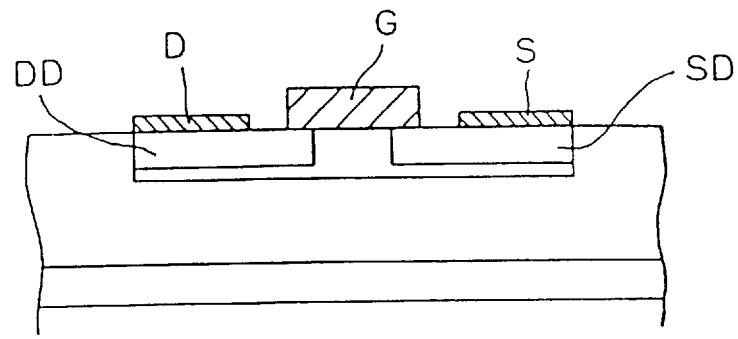

A photoresist pattern is formed, and then a layer of AuGe and a layer of Ni are deposited to respective thicknesses of 1000 Å and 200 Å by vapor deposition. The photoresist pattern and excessive metal layers are removed by liftoff, and the layers of AuGe and Ni are alloyed by heat treatment, producing ohmic source and drain electrodes S, D, as shown in FIG. 6E. In this step, a negative photoresist capable of being lifted off and producing an inverted tapered shape is used to form the photoresist pattern. The photoresist pattern is formed by coating, pre-baking, exposing, post-baking, fully exposing for polymerization, and developing the negative photoresist.

Figure 6F:
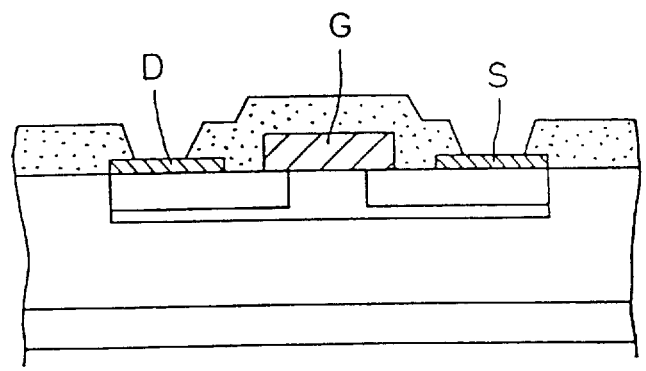
Figure 6G:
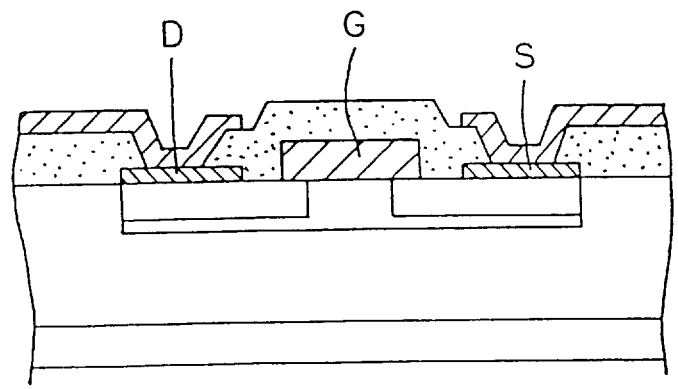

Then, as shown in FIG. 6F, a photosensitive polyimide coating material "Photoneece" (a trademark, manufactured by Toray Industries, Inc.) is coated on the surface of the assembly while in rotation and then pre-baked. Thereafter, the assembly is exposed to a pattern of contact holes for gate, drain, and source regions, and developed, and then heated to evaporate an excessive solvent from the Photoneece, thereby forming a surface protective interlayer film. Then, as shown in FIG. 6G, a layer of Ti and a layer of Au are deposited to respective thicknesses of 500 Å and 10000 Å by vapor deposition, after which a photoresist pattern is formed. The layer of Au is etched by an etching solution of KI and $I_2$ and the layer of Ti is etched by an etching solution of HF, forming interconnections. Then, the photoresist pattern is removed.

Figure 6H:
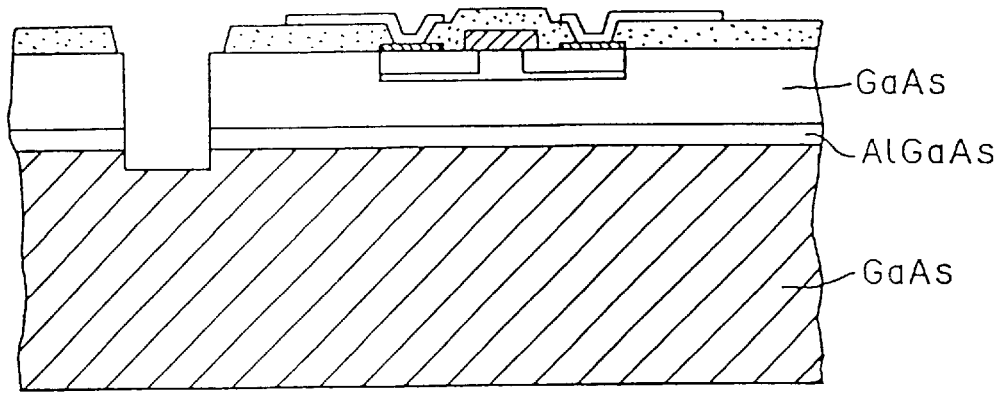

Thereafter, as shown in FIG. 6H, a photoresist pattern is formed, and the assembly is etched at its peripheral portion by an etching solution of $H_2SO_4$ until the AlGaAs layer is penetrated. Using a double-sided mask aligner, a photoresist pattern is formed on the reverse side of the assembly, and the GaAs layer is etched by an etching solution of $H_2SO_4$ to form a dicing pattern. At this time, the surface of the assembly is coated with a resist so that the surface is not etched by the etching solution. The coated resist is finally removed.

Figure 6I:
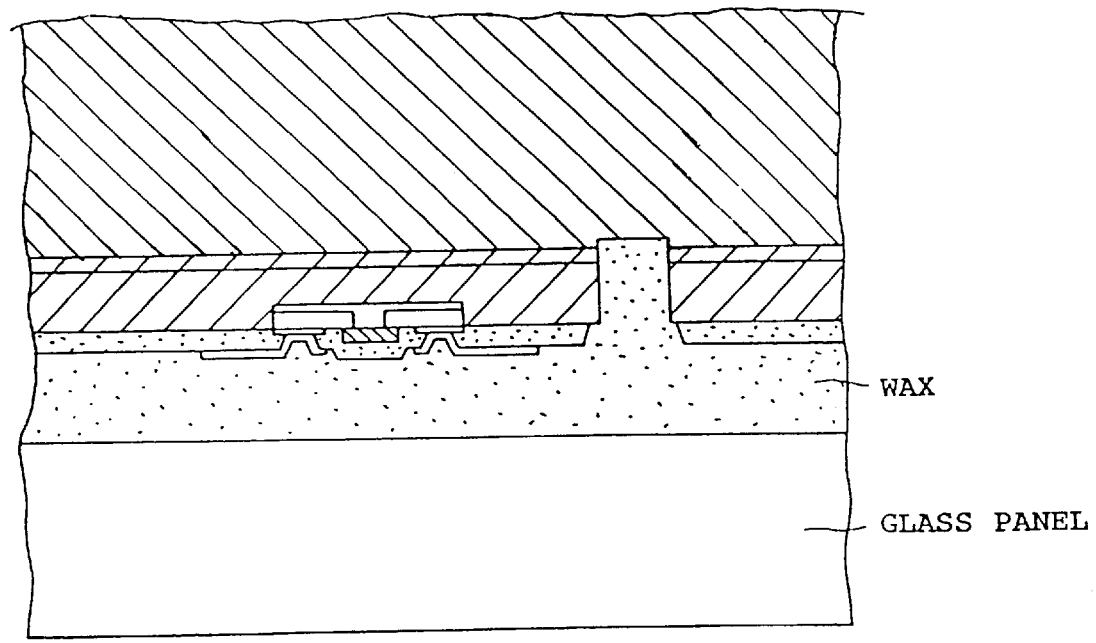
Figure 7:
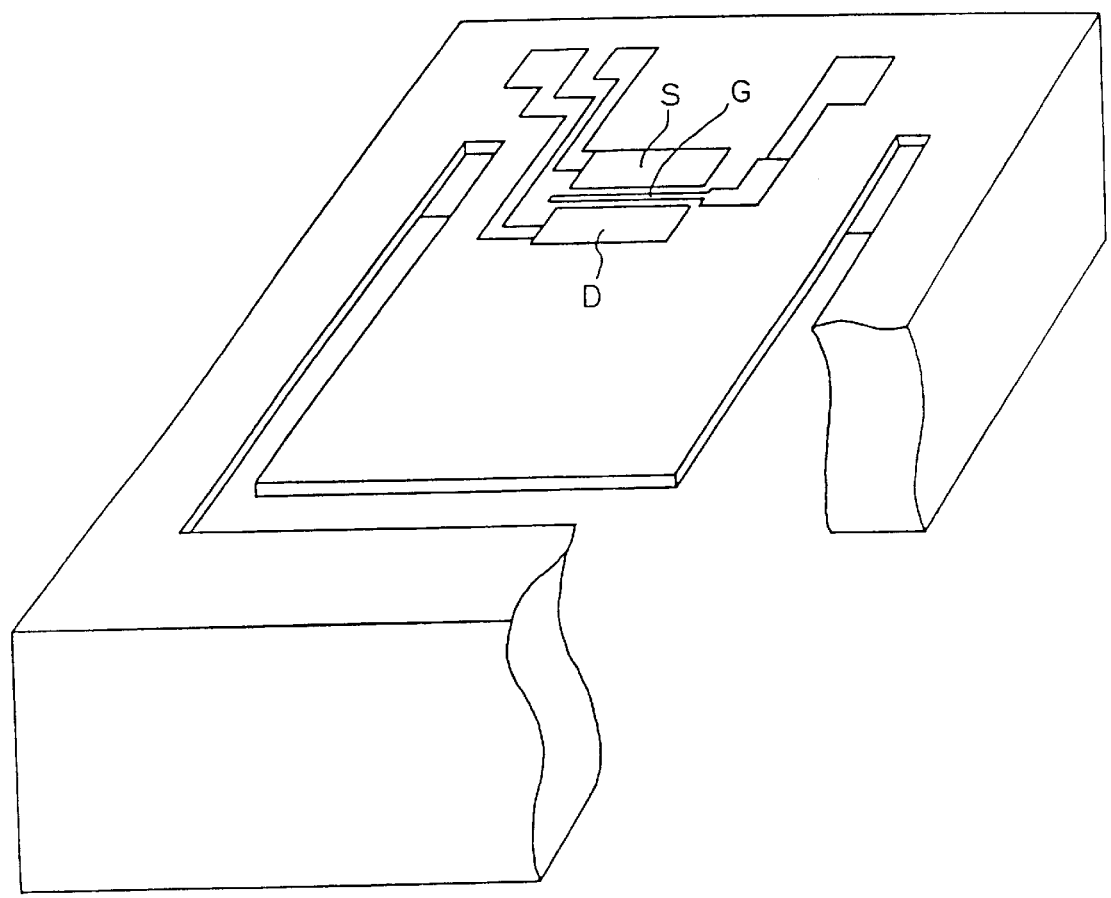
FIG. 7 is a fragmentary perspective view of the semiconductor stress sensor according to the present invention.

Then, as shown in FIG. 6I, a photoresist pattern is formed on the reverse side of the assembly using a double-sided mask aligner, and the assembly is attached, with its surface facing down, to a glass panel with a wax layer interposed between. Thereafter, the GaAs layer and the AlGaAs layer are selectively etched by an etching solution of $NH_4OH$ and $H_2O_2$ with a spin etching apparatus, to shape the epitaxial layer formed in the first step into a cantilever. Finally, the assembly is cut into chips by a dicing apparatus, and the wax layer is melted by a solvent. The chips are then removed from the glass panel. Each of the chips is in the form of a semiconductor stress sensor as shown in FIG. 7.

Although a certain preferred embodiment of the present invention has been shown and described in detail, it should be understood that various changes and modifications may be made therein without departing from the scope of the appended claims.

What is claimed is:

1. A semiconductor stress sensor comprising
   a semiconductor substrate including a field-effect transistor for detecting a stress in the field-effect transistor based on a change in an output signal of the field-effect transistor,
   said field effect transistor including a p-type semiconductor substrate having an n-type source diffusion layer and an n-type drain diffusion layer deposited on the p-type substrate,
   the field-effect transistor further including a channel layer disposed between the source and drain diffusion layers, the channel layer comprising an inner channel layer and a surface channel layer disposed on the inner channel layer, and
   a gate electrode on an upper surface of the channel layer, and respective source and drain electrodes on the source and drain diffusion layers.

2. A semiconductor stress sensor according to claim 1 wherein
   a donor in the surface channel layer is cancelled out by an acceptor generated based on a surface compression, the surface compression being generated by deposit of the gate electrode on the surface channel layer.

3. A semiconductor stress sensor according to claim 2 wherein
   said field-effect transistor operates as a junction field-effect transistor when the surface channel layer thereof behaves as a p-type semiconductor as a result of a compressive external force thereto, and
   said field effect transistor operates as a metal semiconductor field-effect transistor when the surface channel layer thereof behaves as an n-type semiconductor as a result of a tensile external force thereto.

4. A semiconductor stress sensor according to claim 1 wherein the field-effect transistor is formed from GaAs.

5. A semiconductor stress sensor according to claim 1 wherein
   said field-effect transistor operates as a junction field-effect transistor when the surface channel layer thereof behaves as a n-type semiconductor as a result of a compressive external force thereto, and
   said field effect transistor operates as a metal semiconductor field-effect transistor when the surface channel layer thereof behaves as an n-type semiconductor as a result of a tensile external force thereto.

6. A semiconductor stress sensor according to claim 1 further comprising a cantilever structure, whereby the field-effect transistor is supported in a cantilevered fashion for sensing compressive and tensile forces.

7. A semiconductor stress sensor according to claim 1 wherein a stress is detected based on a change in magnitude of a source-drain current of the field-effect transistor.

8. A semiconductor stress sensor comprising:
   a field-effect transistor disposed in a semiconductor substrate for detecting a stress in the field-effect transistor based on a change in an output signal of the field-effect transistor; and
   said semiconductor substrate having an inner layer and a surface layer disposed adjacent to said inner layer and having a resistance higher than a resistance of said inner layer, and wherein said field-effect transistor operates alternatively as
   (i) a junction field-effect transistor when said surface layer behaves as a p-type structure when a compressive stress is generated in said surface layer, and
   (ii) a metal semiconductor field-effect transistor when said surface layer behaves as an n-type structure when a tensile stress is generated in said surface layer.

9. A semiconductor stress sensor comprising
   a semiconductor substrate and a field-effect transistor disposed in the semiconductor substrate for detecting a stress in the field effect transistor based on a change in an output signal of the field-effect transistor,
   the semiconductor substrate having a channel layer comprising an inner layer and a surface layer disposed adjacent the inner layer and having a resistance higher than the resistance of the inner layer, the surface layer having a gate electrode thereon, and the surface layer being formed when a doner doped in the surface layer and an accepter generated based on a compressive stress which is developed in the surface layer when the gate electrode is formed substantially cancel out each other, and
   the field effect transistor operates alternately as a junction field effect transistor when the surface layer behaves as a p-type structure when a compressive stress is generated in the surface layer, and as a metal semiconductor field effect transistor when the surface layer behaves as an n-type structure when a tensile stress is generated in the surface layer.

10. A semiconductor stress sensor comprising
    a field effect transistor having a semiconductor substrate including an n-type low resistance source diffusion layer and an n-type low resistance drain diffusion layer deposited on a p-type high resistance layer,
    an n-type channel layer having a relatively low resistance which is disposed between the source diffusion layer and the drain diffusion layer,
    the source diffusion layer and the drain diffusion layer being connected respectively to a source electrode and a drain electrode that are mounted on respective surfaces of the source diffusion layer and the drain diffusion layer,
    a gate electrode disposed on a surface of the channel layer, and
    the channel layer comprising an inner channel layer of relatively low resistance disposed on the p-type high resistance layer, and comprising a surface channel layer of a high resistance disposed on the inner channel layer and in contact with the gate electrode.

11. A semiconductor stress sensor as in claim 10 further comprising a cantilever structure, whereby the semiconductor stress sensor is supported in a cantilevered fashion for sensing compressive and tensile forces applied thereto.

* * * * *